US012749495B2

(12) United States Patent
Sharma et al.

(10) Patent No.: US 12,749,495 B2
(45) Date of Patent: Sep. 29, 2026

(54) METHODS AND SYSTEMS OF NOISE AWARE AUDIO VISUAL SPEECH DENOISING

(71) Applicant: TensorType Inc., Palo Alto, CA (US)

(72) Inventors: Gaurav Sharma, Newark, CA (US); Siddharth Srivastava, New Delhi (IN); Kranti Kumar Parida, Bhubaneswar (IN)

(73) Assignee: TensorType Inc., Palo Alto, CA (US)

( * ) Notice: Subject to any disclaimer, the term of this patent is extended or adjusted under 35 U.S.C. 154(b) by 181 days.

(21) Appl. No.: 18/586,187

(22) Filed: Feb. 23, 2024

(65) Prior Publication Data

US 2024/0290339 A1 Aug. 29, 2024

Related U.S. Application Data

(60) Provisional application No. 63/447,803, filed on Feb. 23, 2023.

(51) Int. Cl.
*G10L 21/0216* (2013.01)
*G10L 25/30* (2013.01)

(52) U.S. Cl.
CPC .......... *G10L 21/0216* (2013.01); *G10L 25/30* (2013.01)

(58) Field of Classification Search
CPC ............................ G10L 21/0216; G10L 25/30
See application file for complete search history.

(56) References Cited

U.S. PATENT DOCUMENTS

2003/0210749 A1* 11/2003 Asjadi ................. H04L 27/2647 375/260
2005/0023343 A1* 2/2005 Tsuchinaga ........... G10L 19/018 235/382

OTHER PUBLICATIONS

J.-C. Hou, S.-S. Wang, Y.-H. Lai, Y. Tsao, H.-W. Chang and H.-M. Wang, "Audio-Visual Speech Enhancement Using Multimodal Deep Convolutional Neural Networks," in IEEE Transactions on Emerging Topics in Computational Intelligence, vol. 2, No. 2, pp. 117-128, Apr. 2018 (Year: 2018).*

Song, Qiya, Bin Sun, and Shutao Li. "Multimodal sparse transformer network for audio-visual speech recognition." IEEE Transactions on Neural Networks and Learning Systems 34.12 (2022): 10028-10038. (Year: 2022).*

(Continued)

*Primary Examiner* — Bhavesh M Mehta
*Assistant Examiner* — Joseph J. Yamamoto
(74) *Attorney, Agent, or Firm* — Schwegman Lundberg & Woessner, P.A.

(57) ABSTRACT

The present subject matter provides a method for de-noising an audio visual speech. The method includes modeling a noise in the audio visual speech using a noisy speech from audio data associated with the audio visual speech to generate a reconstructed noise signal. The method includes estimating the reconstructed noise signal in the audio visual speech using an audio signal and a plurality of visual frames. The method includes partitioning the reconstructed noise signal into a plurality of windows and calculate an energy associated with each window. The method includes estimating a noise strength in each window by performing a soft max operation to obtain one or more refined audio features. The method includes fusing the one or more refined audio features and one or more visual features using the noise strength to generate an output that is passed through a decoder to obtain a de-noised audio visual speech.

18 Claims, 13 Drawing Sheets

(56) References Cited

OTHER PUBLICATIONS

Kelkar, S. S., L. L. Grigsby, and J. Langsner. "An extension of Parseval's theorem and its use in calculating transient energy in the frequency domain." IEEE Transactions on Industrial Electronics 1 (1983): 42-45. (Year: 1983).*

* cited by examiner

METHODS AND SYSTEMS OF NOISE AWARE AUDIO VISUAL SPEECH DENOISING

CROSS-REFERENCE TO RELATED APPLICATIONS

This application claims the benefit of U.S. Provisional Patent No. 63/447,803, filed Feb. 23, 2023, and entitled "Methods and Systems of Noise Aware Audio Visual Speech Denoising." This provisional application is herein incorporated by reference in its entirety.

TECHNICAL FIELD

The subject matter disclosed herein generally relates to methods, systems, and machine-readable storage media for audio visual speech denoising.

BACKGROUND

Speech denoising has been a long-standing problem in the area of audio processing. The goal of the task is to obtain a clean speech signal from the degraded recording. The problem is extremely useful as it is almost impossible to record clean audio in a real-world scenario. Various environmental sounds or background noises are encountered (e.g., vehicles passing by and honking, wind blowing, rustling of leaves, dog barking, etc.) while recording audio in outdoor conditions. Even when recording the audio in a noise-free environment, the recording device or its transmission introduces noise in the audio. Clean speech signals not only improve the hearing experience of human listeners but also help in various machine perception tasks such as automatic speech recognition, speaker identification, speech emotion recognition, etc.

The problem with the existing approaches is that almost all of them use a naive combination of both modalities by concatenating the features from both modalities in the bottleneck layer. Accordingly, improvements to existing approaches to the task of speech denoising by considering the other complementary modality, e.g., video (especially the lip region) of the speaker, are needed.

The present invention addresses, inter alia, the problem of speech denoising, where the goal is to extract a clean speech signal from the noisy one using both the noisy speech and the video of the speaker.

Figure 1:
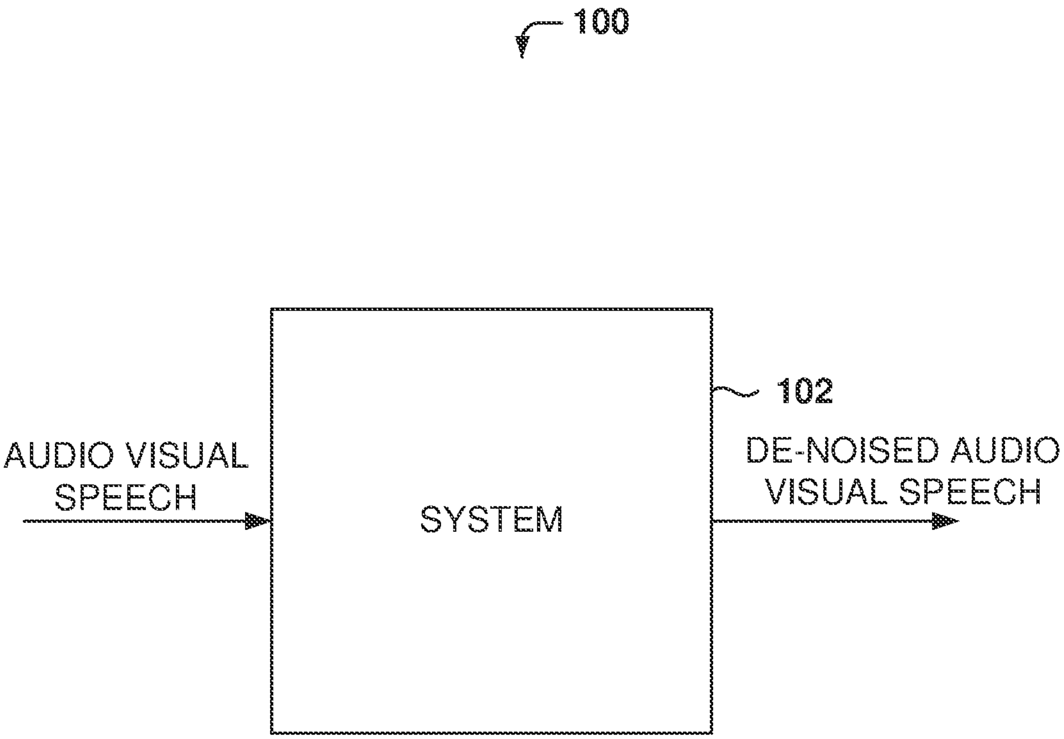
FIG. 1 illustrates a block diagram depicting a system for de-noising an audio visual speech in accordance with an embodiment of the present subject matter.

The Figures described above are a representative set and are not exhaustive with respect to embodying the invention.

DETAILED DESCRIPTION

Example methods, systems, and computer programs are directed to extracting a clean speech signal from a noisy signal using both a noisy speech and a video of a speaker. Another object of the present subject matter is to de-noise an audio visual speech. Examples merely typify possible variations. Unless explicitly stated otherwise, components and functions are optional and may be combined or subdivided, and operations may vary in sequence or be combined or subdivided. In the following description, numerous specific details are set forth to provide a thorough understanding of examples. However, it will be evident to one skilled in the art that the present subject matter may be practiced without these specific details.

Disclosed are a system, method, and article of manufacture for noise-aware audio visual speech denoising. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may but do not necessarily refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of the embodiments of the invention. One skilled in the relevant art can recognize, however, that the invention may be practiced without one or more of the specific details or with other methods, components, materials, and so forth. In other instances, well-known structures, materials, or operations are not shown or described in detail to avoid obscuring aspects of the invention.

In one example, the present subject matter provides a method for de-noising an audio visual speech. The method includes modeling noise in the audio visual speech using a noisy speech from audio data associated with the audio visual speech to generate a reconstructed noise signal. The method includes estimating the reconstructed noise signal in the audio visual speech using an audio signal and a plurality of visual frames associated with the audio visual speech. The method includes partitioning the reconstructed noise signal into a plurality of windows and calculating an energy associated with each window amongst the plurality of windows. The method includes estimating a noise strength in each window by performing a softmax operation over a time domain of the noise signal, wherein the noise strength is used to obtain one or more refined audio features. The method includes fusing the one or more refined audio features along with one or more visual features associated with the audio visual speech using the noise strength to generate an output, wherein the output is passed through a decoder to obtain a de-noised audio visual speech.

In some examples, the present subject matter provides a system for de-noising an audio visual speech. The system includes a modeling engine configured to model noise in the audio visual speech using a noisy speech from audio data associated with the audio visual speech to generate a reconstructed noise signal. The system includes an estimation engine configured to estimate the reconstructed noise signal in the audio visual speech using an audio signal and a plurality of visual frames associated with the audio visual speech. The system includes a partitioning engine configured to partition the reconstructed noise signal into a plurality of windows and calculate an energy associated with each window amongst the plurality of windows. The system includes a noise strength estimation engine configured to estimate the noise strength in each window by performing a softmax operation over a time domain of the noise signal. The noise strength is used to obtain one or more refined audio features. The system includes a fusing engine configured to fuse the one or more refined audio features along with one or more visual features associated with the audio visual speech using the noise strength to generate an output. The output is passed through a decoder to obtain a de-noised audio visual speech.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Artificial neural network (ANN) is based on a collection of connected units or nodes called artificial neurons. Each connection can transmit a signal to other neurons. An artificial neuron receives signals, then processes them, and can signal neurons connected to it. The connections are called edges. Neurons and edges can have a weight that adjusts as learning proceeds. The weight increases or decreases the strength of the signal at a connection. Neurons may have a threshold such that a signal is sent only if the aggregate signal crosses that threshold.

AudioSet consists of an expanding ontology of labeled sound clips (e.g., of 632 audio event classes and a collection of 2,084,320 human-labeled 10-second sound clips drawn from YouTube videos). The ontology can be specified as a hierarchical graph of event categories, covering a wide range of human and animal sounds, musical instruments and genres, and common everyday environmental sounds. It is noted that other ontologies can be utilized in other example embodiments.

AVSpeech is an audio visual dataset that includes speech video clips without interfering with background noises. These segments can be 3-10 seconds long. In each clip, the audible sound in the soundtrack belongs to a single speaking person, visible in the video. It is noted that other audio visual datasets can be utilized in other example embodiments.

Codec is a device or computer program that encodes or decodes a data stream and/or signal.

Convolutional neural network (CNN) is a class of artificial neural network (ANN), most commonly applied to analyze visual imagery. CNNs can be based on the shared-weight architecture of the convolution kernels or filters that slide along input features and provide translation-equivariant responses known as feature maps.

Encoder-Decoder can encode and/or decode a data stream or signal and acts as both an encoder and a decoder on a signal or data stream.

Generative model is a statistical model of the joint probability distribution P(X, Y) on given observable variable X and target variable Y.

Machine learning (ML) can use statistical techniques to give computers the ability to learn and progressively improve performance on a specific task with data without being explicitly programmed. Deep learning is a family of machine learning methods based on learning data representations. Learning can be supervised, semi-supervised, or unsupervised. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia, decision tree learning, association rule learning, artificial neural networks, inductive logic programming, support vector machines, clustering, Bayesian networks, reinforcement learning, representation learning, similarity, and metric learning, and/or sparse dictionary learning. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia, decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g., random decision forests) are an ensemble learning method for classification, regression, and other tasks that operate by constructing a multitude of decision trees at training time and outputting the class that is the mode of the classes (e.g., classification) or mean prediction (e.g., regression) of the individual trees. RFs can correct for decision trees' habit of overfitting to their training set. Deep learning is a family of machine learning methods based on learning data representations. Learning can be supervised, semi-supervised, or unsupervised.

The soft-max function converts a vector of K real numbers into a probability distribution of K possible outcomes. It is a generalization of the logistic function to multiple dimensions and is used in multinomial logistic regression.

Vector quantization (VQ) is a classical quantization technique from signal processing that allows the modeling of probability density functions by the distribution of prototype vectors. It was originally used for data compression. It works by dividing a large set of points (vectors) into groups having approximately the same number of points closest to them. Each group is represented by its centroid point, as in k-means and some other clustering algorithms.

Example Methods and Systems

Humans are quite efficient in extracting and interpreting the speech signal from a noisy audio. Recently, it has been observed that a separate area of the brain becomes active while interpreting noisy audio, thus increasing the cognitive load on the brain in comparison to listening to relatively clean audio. Inspired by these findings, processes described herein replicate similar capabilities in the computational methods for denoising a noisy signal. The noise present in the noisy speech signal can be extracted using a dedicated network from the input of both noisy speech and the corresponding video signal. A network can be trained to explicitly predict the noise signal and produce improved performance.

FIG. 1 illustrates a block diagram 100 depicting a system 102 for de-noising an audio visual speech in accordance with an embodiment of the present subject matter. The system 102 may be configured to extract a clean speech signal from a noisy one using both a noisy speech and a video of a speaker. The system 102 may be configured to model a noise in an audio signal and use a noisy mixed signal to predict a noise in the audio signal.

Continuing with the above embodiment, the system 102 may be configured to model a noise in the audio visual speech. The noise may be modeled using a noisy speech from audio data associated with the audio visual speech. The modeling may be performed to generate a reconstructed noise signal.

To that understanding, the system 102 may be configured to estimate the reconstructed noise signal in the audio visual speech. The estimation of the reconstructed noise signal may be performed using an audio signal and a number of visual frames associated with the audio visual speech. Moving forward, the system 102 may be configured to partition the noise signal into a number of windows. Furthermore, the system 102 may be configured to calculate an energy associated with each window amongst the number of windows.

Subsequently, the system 102 may be configured to estimate a noise strength in each window. For estimating the noise strength in each window, the system 102 may be configured to perform a softmax operation over a time domain of the noise signal. The noise strength may further be used to obtain one or more refined audio features.

Upon obtaining the one or more refined audio features, the system 102 may be configured to fuse the one or more refined audio features along with one or more visual features associated with the audio visual speech. The system 102 may be configured to perform the fusing using the noise strength to generate an output. Furthermore, the output may be passed through a decoder to obtain a de-noised audio visual speech.

Figure 2:
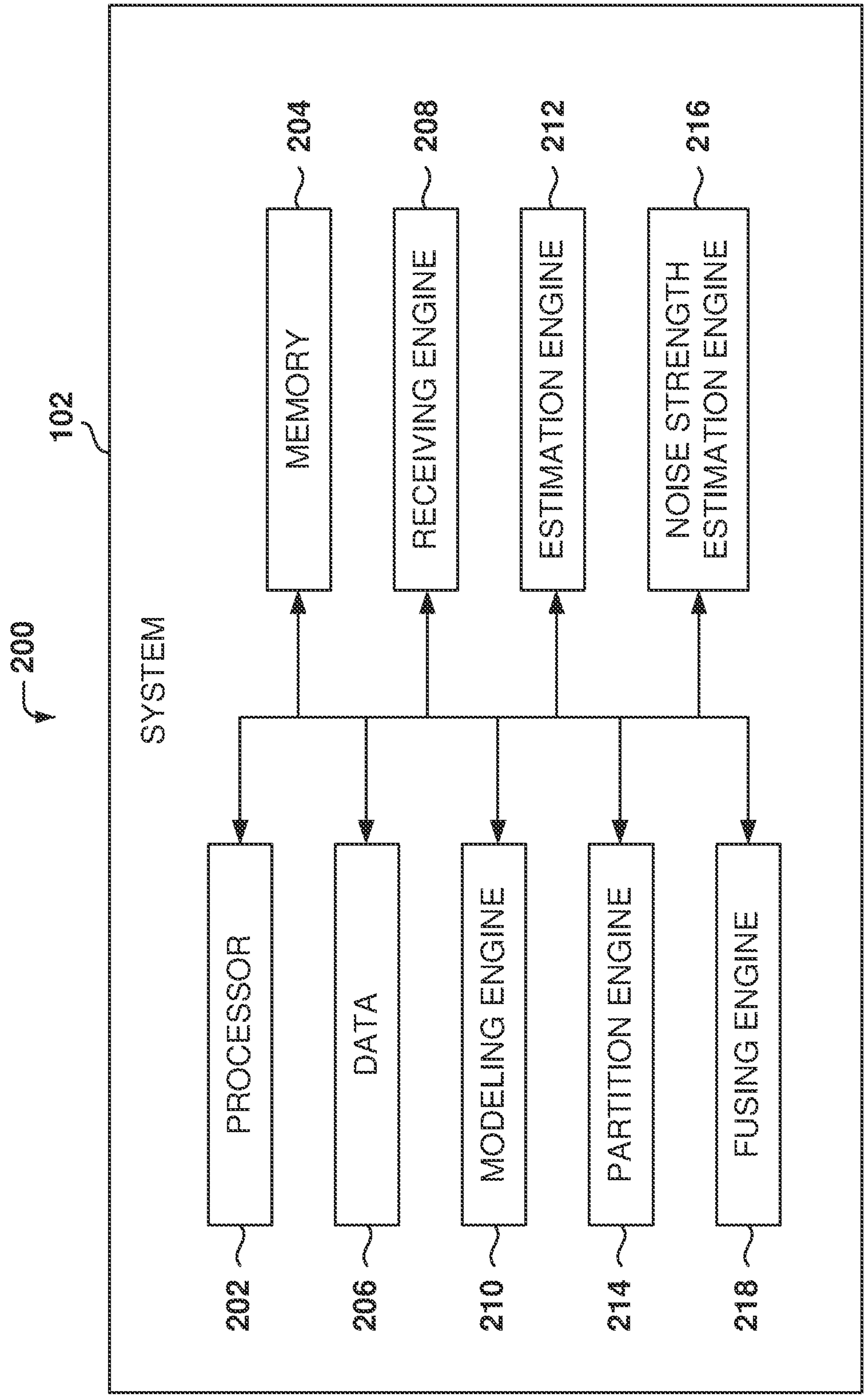
FIG. 2 illustrates a schematic block diagram of the system configured to de-noise an audio visual speech in accordance with an embodiment of the present subject matter.

FIG. 2 illustrates a schematic block diagram 200 of the system 102 configured to de-noise an audio visual speech in accordance with an embodiment of the present subject matter. The audio visual speech may be a video. De-noising may include reducing a noise in the audio visual speech, especially from a part of the audio visual speech where a speaker is speaking and the noise is creating a hindrance for a listener.

In an example, the system 102 may include a processor 202, a memory 204, data 206, a receiving engine 208, a modeling engine 210, an estimation engine 212, a partitioning engine 214, a noise strength estimation engine 216, and a fusing engine 218. In an example, the processor 202, the memory 204, data 206, the receiving engine 208, the modeling engine 210, the estimation engine 212, the partitioning engine 214, the noise strength estimation engine 216, and the fusing engine 218 may be communicatively coupled to one another.

The system 102 may be understood as one or more of a hardware, a configurable hardware, and the like. In an example, the processor 202 may be a single processing unit or a number of units, all of which could include multiple computing units. Among other capabilities, the processor 202 may be configured to fetch and/or execute computer-readable instructions and/or data stored in the memory 204.

In an example, the memory 204 may include any non-transitory computer-readable medium known in the art, including, for example, volatile memory, such as static random access memory (SRAM) and/or dynamic random access memory (DRAM), and/or nonvolatile memory, such as read-only memory (ROM), erasable programmable ROM (EPROM), flash memory, hard disks, optical disks, and/or magnetic tapes. The memory 204 may further include the data 206.

The data 206 serves, amongst other things, as a repository for storing data processed, received, and generated by the system 102. Continuing with the above embodiment, the receiving engine 208 may be configured to receive an input. The input may be the audio visual speech. The receiving engine 208 may be configured to extract audio data and visual data from the audio visual speech. The audio data may include a noisy speech.

Moving forward, the modeling engine 210 may be configured to model a noise in the audio visual speech. The modeling may be performed using the noisy speech from audio data associated with the audio visual speech. The modeling engine 210 may be configured to model the noise to generate a reconstructed noise signal. The modeling engine 210 may include an encoder and, a vector quantization model, and a decoder for performing the fusing. The encoder and a vector quantization model may be configured to receive a noise signal associated with the noise in the audio visual speech as an input to generate a compressed representation. Furthermore, the decoder may be configured to pass the compressed representation, for generating the reconstructed noise signal in a time domain signal.

Subsequent to the generation of the reconstructed noise signal by the modeling engine 210, the estimation engine 212 may be configured to estimate the reconstructed noise signal in the audio visual speech. The estimation engine 212 may be configured to estimate the reconstructed noise signal using an audio signal and a number of visual frames associated with the audio visual speech. The number of visual frames may correspond to a lip region of a face of a speaker in the audio visual speech. Upon the estimation of the reconstructed noise signal by the estimation engine 212, the partitioning engine 214 may be configured to partition the reconstructed noise signal into a number of windows. The partition may be based on a time stamp associated with the audio visual speech. Upon partitioning the reconstructed noise signal, the partitioning engine 214 may be configured to calculate an energy associated with each window amongst the number of windows.

Continuing with the above embodiment, in response to the partition of the reconstructed noise signal and calculation of the energy in each window, the noise strength estimation engine 216 may be 30 configured to estimate a noise strength in each window. The noise strength may be estimated by performing a softmax operation over a time domain of the noise signal. The noise strength may be used to obtain one or more refined audio features.

Moving forward, the fusing engine 218 may be configured to fuse the one or more refined audio features along with one or more visual features associated with the audio visual speech using the noise strength to generate an output. The one or more visual features may correspond to a lip region of a face of a speaker in the audio visual speech. The one or more visual features may be generated from the number of visual frames corresponding to a lip region of a face of a speaker in the audio visual speech by processing the number of visual frames through a deep learning model.

The output may be passed through a decoder to obtain the de-noised audio visual speech. In an embodiment, the fusing engine 218 may be configured to perform the fusing by assigning a high weightage to a refined audio feature from the one or more audio features corresponding to a time stamp having a high amount of noise from the audio visual speech. Fusing may further include assigning a low weightage to at least one other refined audio feature corresponding to another time stamp having a low amount of noise from the audio visual speech.

Figure 3:
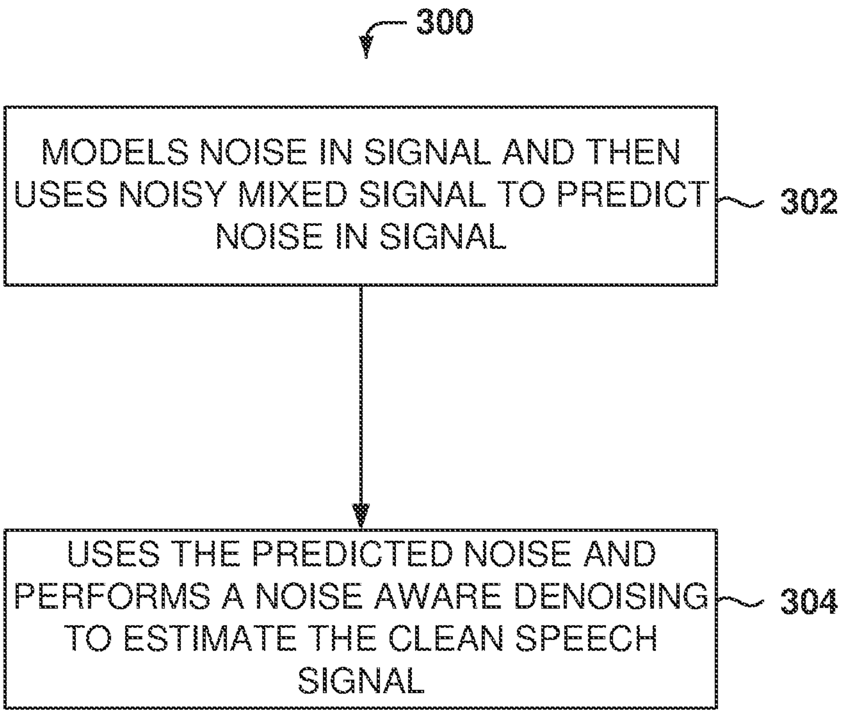
FIG. 3 illustrates an example process for noise-aware audio visual speech denoising, according to some embodiments.

FIG. 3 illustrates an example process 300 for noise-aware audio visual speech denoising, according to some embodiments. Process 300 follows a two-step approach. In step 302, process 300 models noise in the signal and then uses noisy mixed signal to predict noise in the signal. In step 304, process 300 uses the predicted noise and performs a noise-aware denoising to estimate the clean speech signal. Specifically, process 300 can use the estimate noise strength to separate out clean features versus the noisy ones and then use the same to combine visual and audio features adaptively. Process 300 can use speech datasets (e.g., AVspeech, etc.) and background datasets (e.g., Audioset, etc.).

Figure 4:
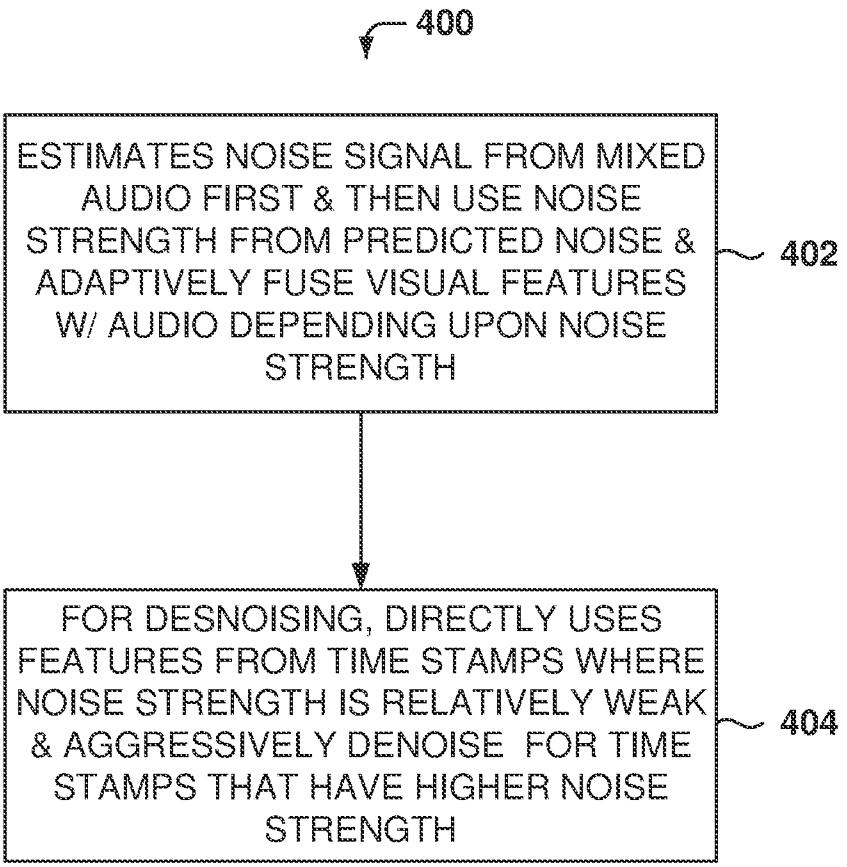
FIG. 4 illustrates an example of a noise-aware attention process to fuse audio and visual features, according to some embodiments.

FIG. 4 illustrates an example noise-aware attention process 400 to fuse audio and visual features, according to some embodiments. In step 402, process 400 estimates the noise signal from the mixed audio first. Then, it uses the noise strength from the predicted noise and adaptively fuses visual features with audio depending on the noise strength. In step 404, process 400, for denoising, directly uses the features from the time stamps where the noise strength is relatively weak and aggressively denoise for the time stamps that have higher noise strength.

Processes 300 and 400 can be used to obtain clean speech from its noisy version. Processes 300 and 400 can use both the audio and lip regions of the speaker to denoise and enhance the quality of noisy audio.

Figure 5:
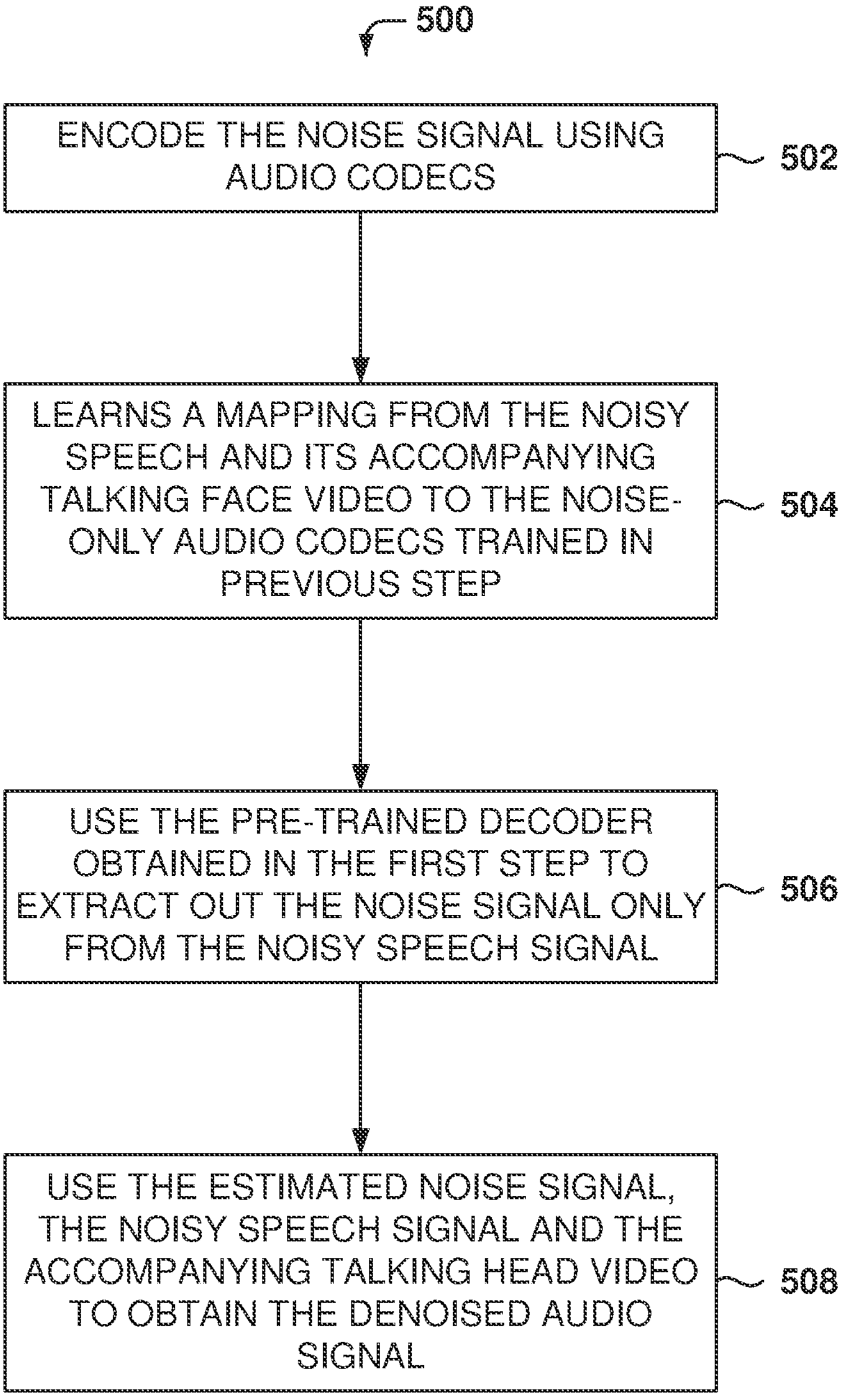
FIG. 5 illustrates an example process for training the network to explicitly predict the noise signal, which produces improved performance, according to some embodiments.

FIG. 5 illustrates an example process 500 for training the network to explicitly predict the noise signal, which produces improved performance, according to some embodiments.

In step 502, process 500 can encode the noise signal using audio codecs. This may use only audio codecs as used in previous works for audio compression. The audio codecs can be strong enough to reconstruct high-quality audio back using a decoder given only the codecs.

In step 504, process 500 learns a mapping from the noisy speech and its accompanying talking face video to the noise-only audio codecs trained in step 502.

In step 506, process 500 can then use the pre-trained decoder obtained in the first step to extract out the noise signal only from the noisy speech signal.

In step 508, process 500 can then use the estimated noise signal, the noisy speech signal, and the accompanying talking head video to obtain the denoised audio signal. A reverse approach (e.g., where instead of learning codecs for the different noise types) can be used to learn codecs for clean speech signal, which makes their setting restricted to have a model specific to each speaker.

Figure 6:
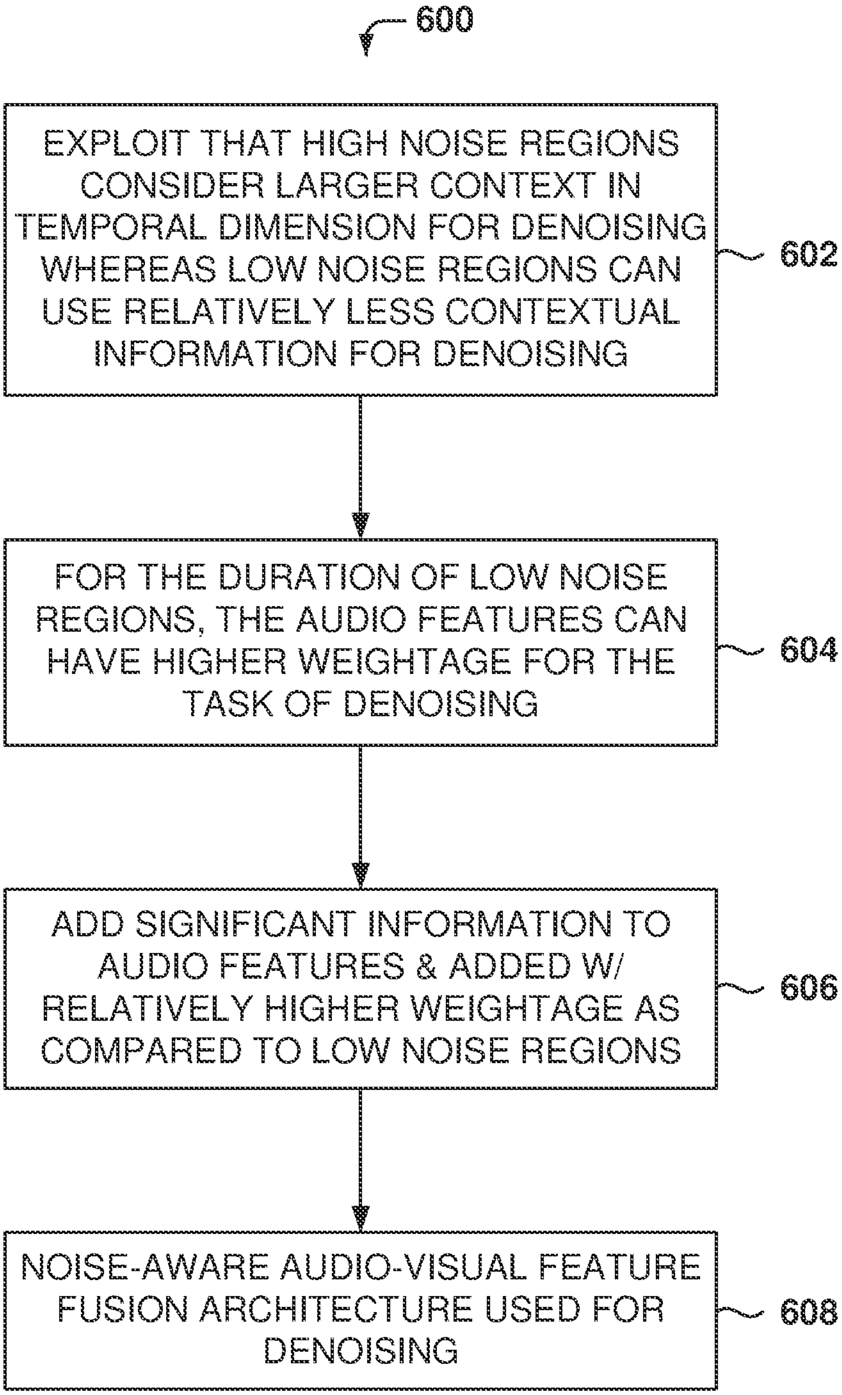
FIG. 6 illustrates an example process for implementing a noise-aware feature fusion module, according to some embodiments.

FIG. 6 illustrates an example process 600 for implementing a noise-aware feature fusion module, according to some embodiments. In step 602, the noise-aware feature fusion module exploits the fact that high-noise regions can consider the larger context in the temporal dimension for denoising. In contrast, the low-noise regions can use relatively less contextual information for denoising. For the extreme case, consider that for a particular time instant, the power of the noise signal is zero. The features need not consider any of the context information and directly copy the input features at the output. Further, for the duration of low noise regions, the audio features can have higher weightage for the task of denoising in step 604. In the case of high-noise regions, visual features can potentially add significant information to audio features and thus should be added with relatively higher weightage as compared to low-noise regions in step 606. In order to take the purpose into account, a tailored novel noise-aware audio visual feature fusion architecture can be used for the task of denoising in step 608. The noise-aware feature fusion module architecture provides improved performance.

Figure 7:
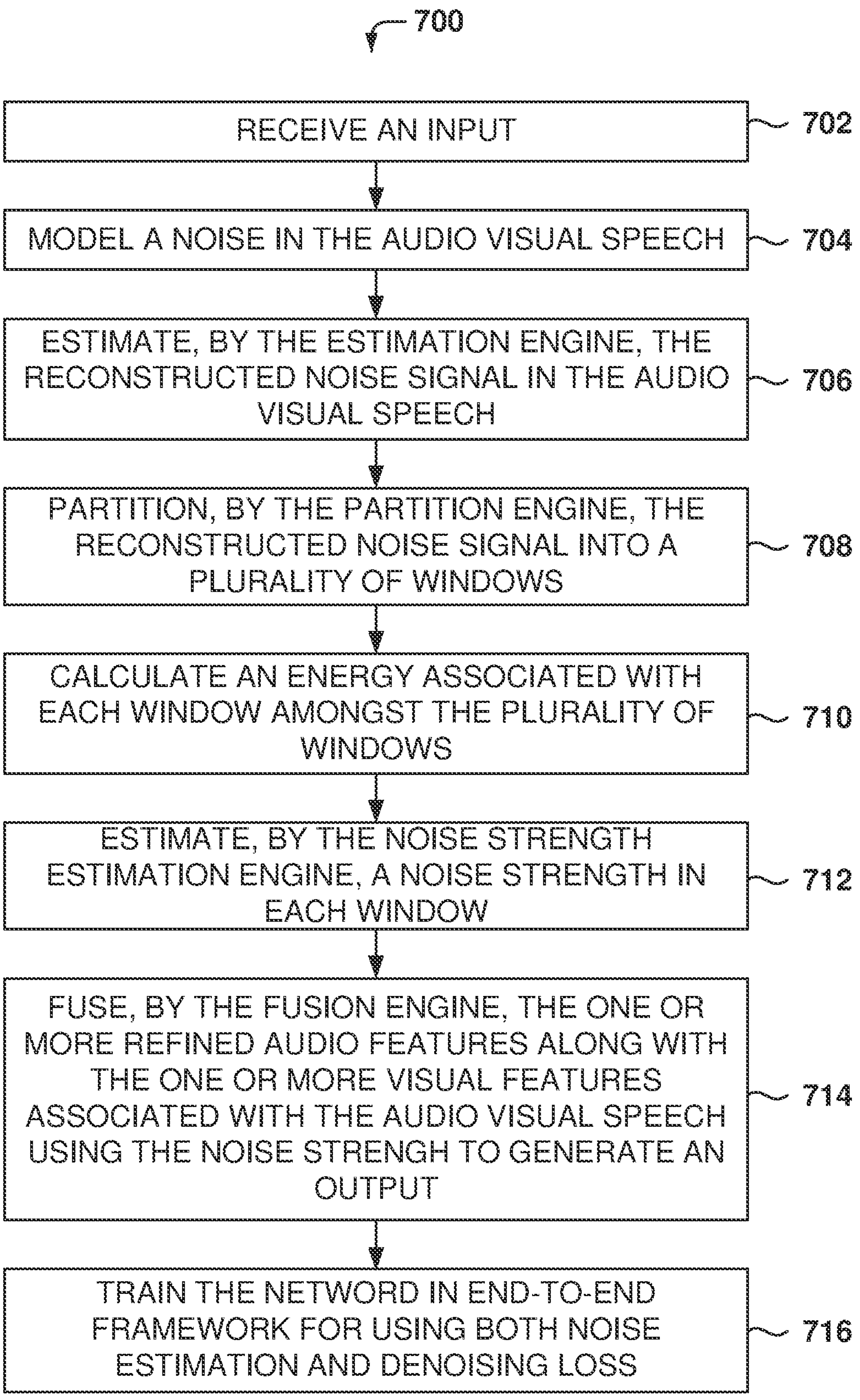
FIG. 7 illustrates an operational flow diagram depicting a process of de-noising an audio visual speech in accordance with an embodiment of the present subject matter.

FIG. 7 illustrates an operational flow diagram depicting a process 700 de-noising an audio visual speech in accordance with an embodiment of the present subject matter. The process 700 may be performed by the system 102. De-noising may include removing a noise from the audio visual speech. The process 700 may be used to obtain clean speech from a noisy version of the clean speech related to the audio visual speech. The process 700 may use both audio and lip regions of a speaker from the audio visual speech to de-noise and enhance the quality of noisy audio. The process 700 may generalize well to real-world videos and to other noise datasets that may not be seen during training.

At step 702, the process 700 may include receiving an input. The input may be received by the receiving engine 208, as referred to in FIG. 2. The input may be the audio visual speech. The receiving engine 208 may be configured to extract audio data and visual data from the audio visual speech. The audio data may include a noisy speech.

At step 704, the process 700 may include modeling a noise in the audio visual speech. The modeling may be performed by the modeling engine 210, as referred to in FIG. 2. In an embodiment, the process 700 may include modeling different types of noise using a vector-quantized encoder-decoder model. Further, the modeling may be performed using the noisy speech from audio data associated with the audio visual speech and a large-scale noise dataset that may serve as a better pre-trained network for downstream tasks like environmental sound classification, audio representation, and the like.

The modeling engine 210 may be configured to model the noise to generate a reconstructed noise signal. Modeling may include learning a quantized representation of a noise signal, and the next step may be learning a mapping from the noisy signal to its corresponding quantized noise representation. The process 700 may include learning a good noise representation of different variety of noises available in the real world using a compact codebook matrix. Modeling may include may be configured to receive a noise signal associated with the noise in the audio visual speech as an input at the encoder and a vector quantization model to generate a compressed representation. Furthermore, the decoder may be configured to pass the compressed representation, for generating the reconstructed noise signal in a time domain signal.

At step 706, the process 700 may include estimating by the estimation engine 212 the reconstructed noise signal in the audio visual speech. The estimation engine 212 may be configured to estimate the reconstructed noise signal using an audio signal and a number of visual frames associated with the audio visual speech. The number of visual frames may correspond to a lip region of a face of a speaker in audio visual speech.

At step 708, the process 700 may include partitioning by the partitioning engine 214, the reconstructed noise signal into a number of windows. The partition may be based on a time stamp associated with the audio visual speech.

At step 710, the process 700 may include calculating an energy associated with each window amongst the number of windows. The energy may be calculated by the partitioning engine 214. At step 712, the process 700 may include estimating by the noise strength estimation engine 216 a noise strength in each window. The noise strength may be estimated by performing a softmax operation over a time domain of the noise signal. The noise strength may be used to obtain one or more refined audio features. The noise strength may be used to separate clean features from noisy features from the audio visual speech, then may use the same to combine visual and audio features in the step 714 adaptively. The process 700 may utilize speech datasets (e.g., AVspeech, etc.) and background datasets (e.g., Audioset, etc.). The process 700 may use a unified framework for speech de-noising that ignores a requirement of having speaker-specific models. The process 700 may include adding a visual modality and explicitly modeling the noise signal to improve the de-noising performance of the noisy signal, especially for high noise cases.

At step 714, the process 700 may include fusing by the fusing engine 218, the one or more refined audio features along with one or more visual features associated with the audio visual speech using the noise strength to generate an output, exploiting a time-varying property of the noise signal for the task of speech de-noising. The one or more visual features may correspond to a lip region of a face of a speaker in the audio visual speech. The one or more visual features may be generated from the number of visual frames corresponding to a lip region of a face of a speaker in the audio visual speech by processing the number of visual frames through a deep learning model. The output may be passed through a decoder to obtain the de-noised audio visual speech. In an embodiment, the fusing engine 218 may be configured to perform the fusing by assigning a high weightage to a refined audio feature from the one or more audio features corresponding to a time stamp having a high amount of noise from the audio visual speech. Fusing may further include assigning a low weightage to at least one other refined audio feature corresponding to another time stamp having a low amount of noise from the audio visual speech.

At step 716, the process 700 may include training by the processor 204, the network in the end-to-end framework for using both noise estimation and de-noising loss.

Figure 8:
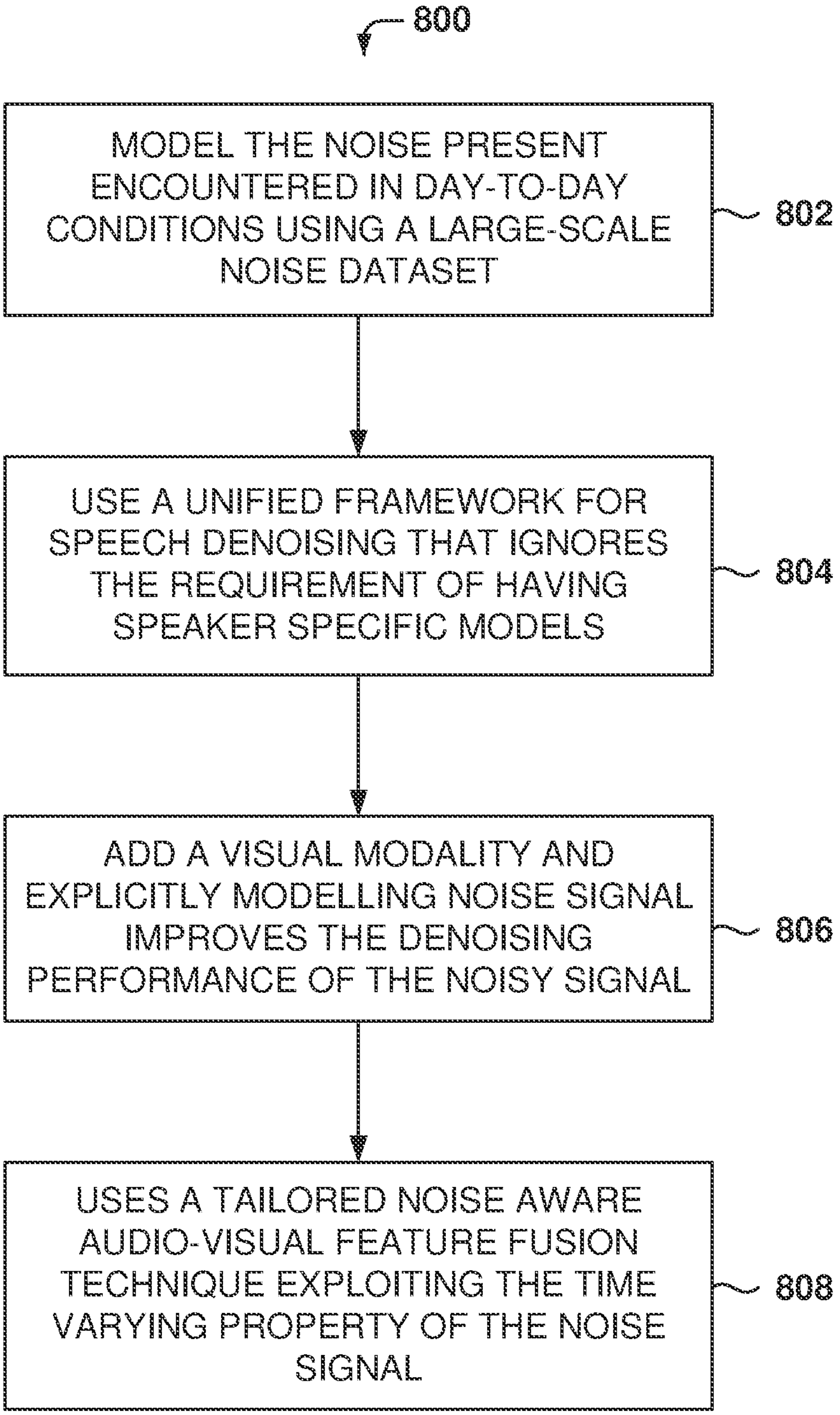
FIG. 8 illustrates an example process for noise-aware audio visual speech denoising, according to some embodiments.

FIG. 8 illustrates an example process 800 for noise-aware audio visual speech denoising, according to some embodiments. In step 802, process 800 models the noise present encountered in day-to-day conditions using a large-scale noise dataset. This also serves as a better pre-trained network for downstream tasks like environmental sound classification, audio representation, etc.

In step 804, process 800 uses a unified framework for speech denoising that ignores the requirement of having speaker-specific models. In step 806, the process adds a visual modality, and explicitly modeling the noise signal improves the denoising performance of the noisy signal, especially for high noise cases. In step 808, process 800 uses a tailored noise-aware audio visual feature fusion technique exploiting the time-varying property of the noise signal for the task of speech denoising. Process 800 can generalize well to real-world videos and to other noise datasets that were not seen during training.

Figure 9:
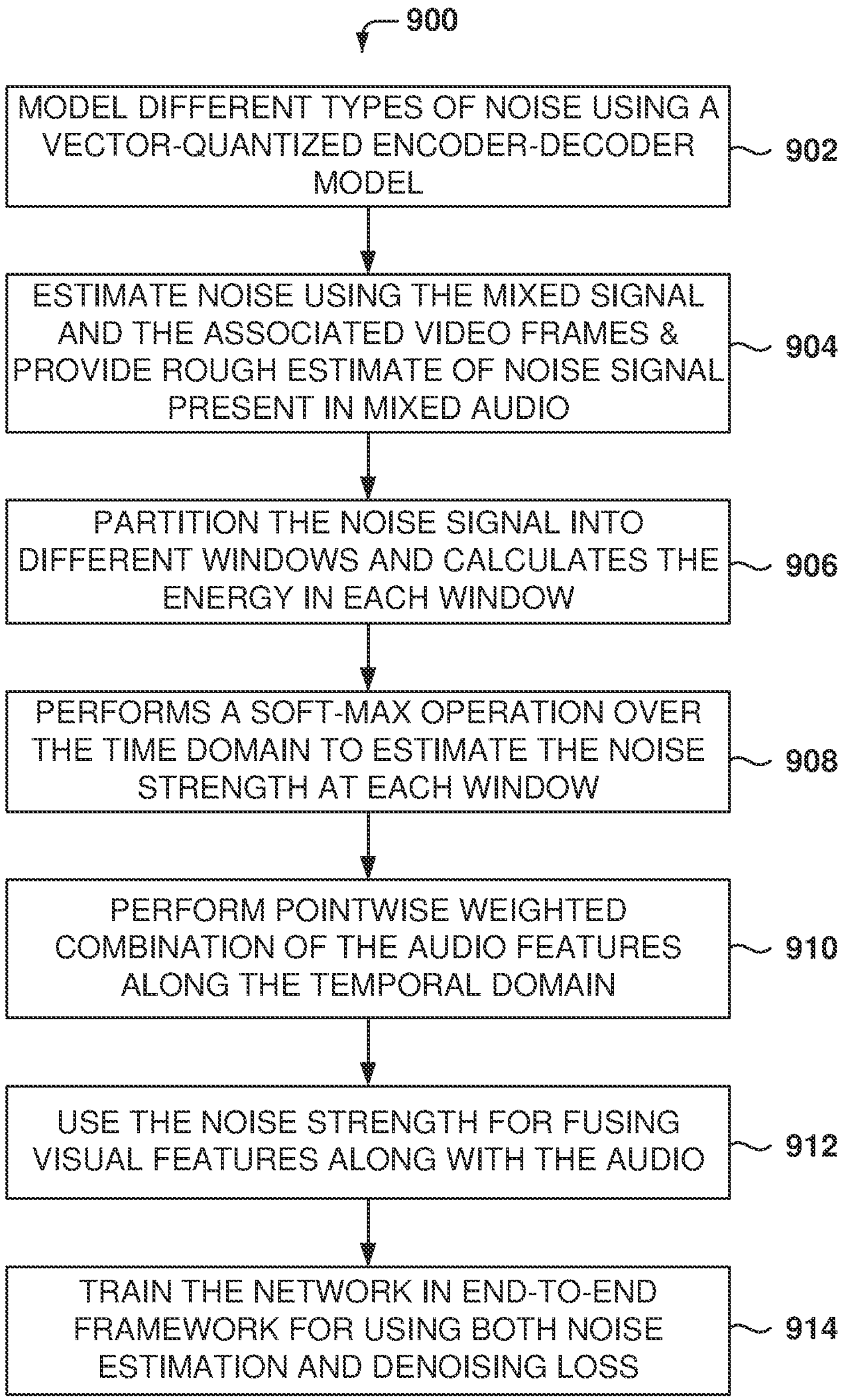
FIG. 9 illustrates an example process for noise-aware audio visual speech denoising, according to some embodiments.

FIG. 9 illustrates an example process 900 for noise-aware audio visual speech denoising, according to some embodiments. In step 902, process 900 first models different types of noise using a Vector-Quantized Encoder-Decoder model. The model follows a two-step approach, where the first step is learning a quantized representation of a noise signal, and the next step is learning a mapping from the noisy signal to its corresponding quantized noise representation.

Here, process 900 learns a good-noise representation of a different variety of noises available in the real world using a compact codebook matrix. In step 904, once the noise modeling is done, in the next step of learning, process 900 estimates the noise using the mixed signal and the associated video frames. Step 904 provides a rough estimate of the noise signal present in the mixed audio.

In step 906, process 900 then partitions the noise signal into different windows and calculates the energy in each window. In step 908, process 900 then performs a soft-max operation over the time domain to estimate the noise strength at each window. Process 900 uses this information both for obtaining better audio features and effectively combining video features along with the audio.

Process 900 then performs a pointwise weighted combination of the audio features along the temporal domain in step 910. This can be performed such that the region of lower noise is directly used as the output of denoising, whereas the regions of higher noise take the context audio information into account for denoising. Process 900 can perform this combination by using a transformer framework for a weighted combination of audio features.

In step 912, after obtaining the audio features, process 900 then uses the noise strength to fuse visual features along with the audio. Here, process 900 can use noise strength and give higher weightage to visual features for noisy regions and lower weightage to less noisy regions as the audio features themselves are capable of providing better results. In step 914, process 900 trains the network in the end-to-end framework for using both noise estimation and denoising loss.

Figure 10:
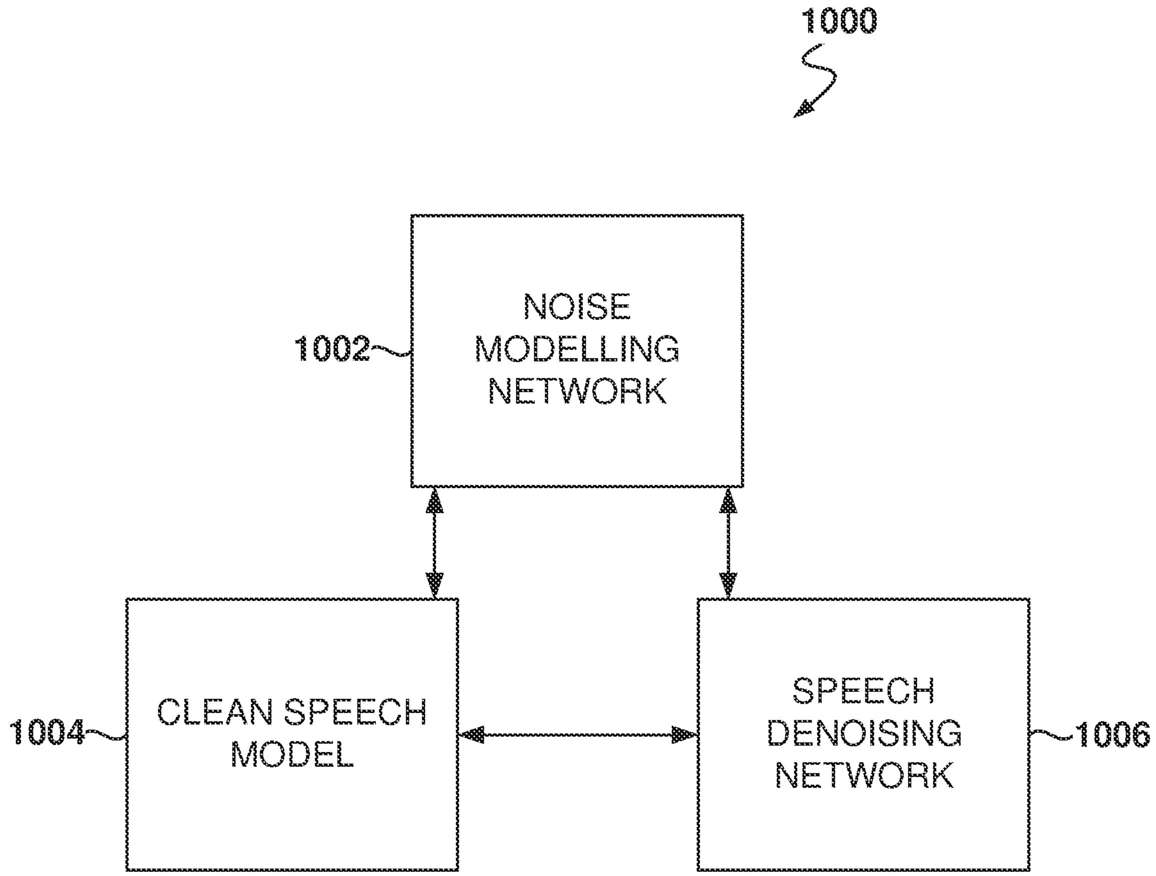
FIG. 10 illustrates an example system used to obtain a clean speech signal from a noisy/mixed speech signal, according to some embodiments.

FIG. 10 illustrates an example system 1000 used to obtain a clean speech signal from a noisy/mixed speech signal, according to some embodiments. The mixed signal can be considered as a mixture of clean speech signal and a noise signal. Let ai∈Rt, n∈Rt, a∈Rt be the input clean audio, noise, and the mixed signals respectively and t be the length of each signal. Let Pai and Pn represent $$a = a_i + \frac{n}{r} \text{ where, } r = \sqrt{\mathrm{Pa_1}} \Big/ \sqrt{\frac{P_n}{10^{\frac{S}{10}}}} \tag{1}$$

the power of input clean audio and noise signal respectively and S be the SNR of the mixed signal. The mixed signal a is then given by, System 1000 can predict the clean signal ai from the mixed signal a, given just the mixed signal. System 1000 can include, inter alia, three blocks: (1) noise modeling network 1002, (2) clean speech model 1004 and (3) speech denoising network 1006.

System 1000 can model the noise and the clean speech separately using an encoder-decoder framework. System 1000 can denoise the noisy speech signal using noisy audio and the lip regions of the speaker by using a noise-aware feature representation for audio and noise-aware audio visual feature fusion and the bottleneck layer of the denoising network. System 1000 can use a decoder along with skip connections to obtain a final denoised signal.

Noise modeling network 1002 is now discussed. A Vector-Quantized model can be used to obtain a discrete representation of the audio. It consists of encoder, codebook and decoder module for the same and similar architecture can be used for the task of audio compression. It takes as input the noise signal n∈R1×t and after passing through the encoder and vector quantization model, produces a compressed representation nq. Noise modeling network 1002 then passes the compressed representation through the decoder model to get the reconstructed noise signal in the time domain signal n̂. Noise modeling network 1002 can use ℓ 1 reconstruction loss for training the network.

Clean speech model 1004 is now discussed. System 1000 can model the clean speech signal whose intermediate representation can be used in the later stage to guide the learning of denoising network. The network includes an encoder-decoder architecture and takes as input the clean speech audio ai feat∈R1×t and obtains an intermediate representation $a_i^{feat} \in R^{1\times T\times F}$ where T and F are the number of windows in the final audio signal and the feature dimension of audio signal in each window respectively. The encoder includes of 1D convolution and LSTM at the final layer, whereas the decoder includes of 1D transposed convolution. This framework of encoder-decoder architecture can provide improved performance in prior works of audio-only source separation and denoising. Similar to the noise-only modeling, clean speech model 1004 can use ℓ 1 reconstruction loss for training the network.

Figure 11:
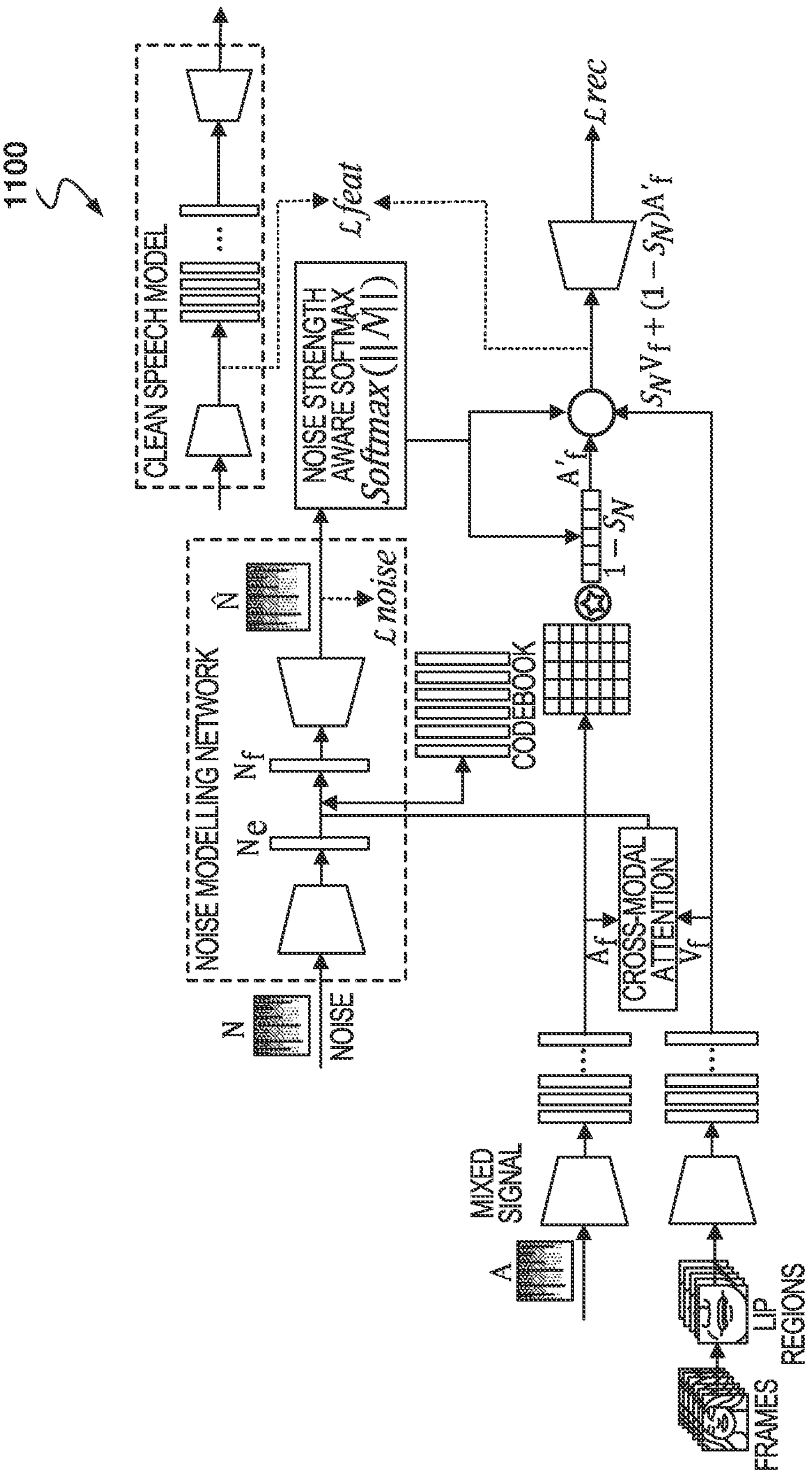
FIG. 11 illustrates an example noise modeling network, according to some embodiments.

FIG. 11 illustrates an example noise modeling network 1100, according to some embodiments. Noise modeling network 1100 comprises a clean speech model and noise-aware denoising model. The noise modeling and the clean speech models are trained on the noise samples and clean speech signal respectively. Noise modeling network 1100 separately encodes the mixed audio and the lip regions using their respective encoders. For denoising the noisy speech signal, noise modeling network 1100 uses the input noisy audio and the corresponding lip regions of the talking speaker to estimate noise only from the noisy speech signal. Noise modeling network 1100 then uses the estimated noise signal to compute noise strength at different time stamps for the audio. The noise strength is used for modulating the audio feature aggregation at different time stamps and also for fusing both audio and visual features.

A system 1100 of a speech denoising network is now discussed. For denoising, we use a separate encoder network for audio and video, respectively. For the audio signal, we use an encoder similar to the one used for the clean speech modeling. The encoder takes the mixed audio signal a∈R1×t and produces audio features af∈RT×F. Similarly, for the video feature extractor network, we input video frames of cropped mouth regions (e.g., V∈RN×H×W) where N is the number of frames, H and W are height and width of each frame in the input.

The system 1100 for the speech denoising network follows the state-of-the-art lip reading network to extract the features. The system 1100 includes a 3D conv-layer, which is an extension of a 2D conv-layer usually applied for 2D images, where instead of a 2D filter, a 3D filter is slid over a 3D input video. This is followed by a shuffleNet-V2 network, where the channel shuffling operation is performed in the intermediate feature maps for the network to effectively share information across feature channels in a convolutional neural network. Finally, a temporal convolutional neural network (TCN) is applied on top of it, where convolution is performed across the temporal dimension and output at any timestamp t is dependent only on the previous timestamps.

The system 1100 can obtain video features, vf∈RN×F, where N is the number of input frames, and d is the features for each frame of the video. Although the number of input and output channels are the same, the network consists of conv 3D and TCN layers, which enforces the network to look into nearby frames while extracting the feature for a particular frame. The system 1100 then performs linear interpolation of visual features to align the temporal dimension of both modalities (e.g., make visual features to have dimension vf∈RT×F). The system 1100 can then concatenate audio and video features along the temporal dimension and obtain avf∈R2T×F and perform self-attention among the concatenated features to obtain the final fused features avfused∈RT×F. The system 1100 can use the fused features and pre-trained codebook, and the decoder obtained in the noise modeling network to estimate the noise n^∈R1×t present in the mixed signal.

In the next step, system 1100 can partition the estimated noise n̂ into non-overlapping windows and calculate the energy within each window and perform a soft-max operation to normalize the signal (e.g., $S_N$). Here, system 1100 partitions the time-domain signal such that the no. of windows is equal to the temporal dimension of audio and video features (e.g., $S_N \in R^{1\times N}$). System 1100 can then perform self-attention for the audio features only and ignore the self-attention for the time stamps where noise signal is significantly less. System 1100 can perform the operation as mentioned in the equation below.

$$a'_f = [S_N \geq th] \odot \text{Softmax}\left(\frac{Q^T K}{\sqrt{d_k}}\right) * V + [S_N < th], \odot V \quad (2)$$

In equation (2), th is the hyperparameter for thresholding the noise strength in the signal to denote the regions that are noisy and noise free.

Finally, system 1100 can fuse the audio and video features using the noise strength. System 1100 can ensure that the noisy regions should rely significantly more on the visual features as compared to the audio features. System 1100 can perform the same as mentioned in equation (3) below.

$$f_{multi} = S_N \odot v_f + 1 - S_N \odot a_f \quad (3)$$

System 1100 can then pass the audio visual fused features $f_{multi}$ through the decoder layer to obtain the final denoised signal (e.g., $a\hat{}_i$). System $$\mathcal{L}_{tot} = \|n - \hat{n}\|_1 + \|a_i^{feat} - f_{multi}\|_1 + \|a_i - \hat{a}_i\|_1. \quad (4)$$

1100 can use three different reconstruction loss to train our network in an end-to-end fashion. The total loss function is described in equation (4) below.

Example embodiments provided by example and not of limitation are now discussed. System 1100 can obtain clean audio samples from Voxceleb2 and AVSpeech dataset. Voxceleb2 dataset contains videos from 9112 unique speakers with over 1 million utterances. Following standard settings on the dataset, we use 5994 and 118 identities in train and val set respectively. System 1100 can further divide the validation set of VoxCeleb2 into val and test sets containing 59 identities each. AVSpeech dataset contains in-the wild videos downloaded from YouTube and we use a subset of 10000 videos for training and 2000 each for validation and testing.

System 1100 can mix ground truth speech utterances with non-speech audio from another dataset (e.g., Audioset, etc.) to generate noisy audio synthetically for both training and testing. The mixing can be performed with varying levels of Signal-to-Noise Ratio (SNR). System 1100 can make a fixed validation and test set where system 1100 samples two input speech signals for each identity and two non-speech audio samples from Audioset.

Audio denoising can be helpful in a variety of domains, such as entertainment, communication, etc. Further, given the current situation of remote work and increased adoption of video conferencing systems, audio denoising in real-world scenarios has become not only important but an essential part of such systems. System 1100 can be useful in these cases to exploit complementary information from both audio and video modality. System 1100 can use the various processes (e.g., processes 300-900, etc.).

Figure 12:
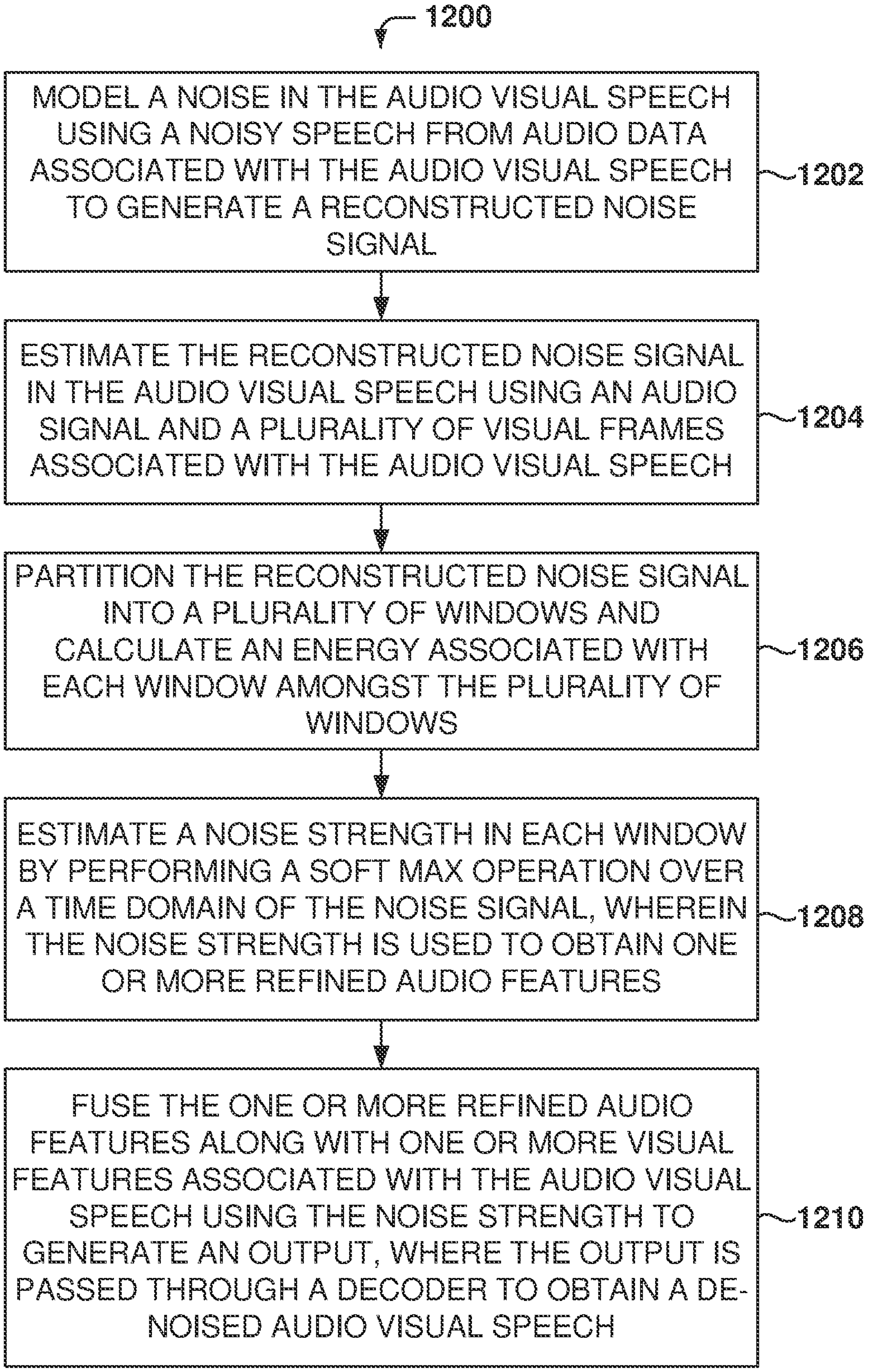
FIG. 12 depicts an exemplary computing system that can be configured to perform any one of the processes provided herein.

FIG. 12 illustrates a block diagram depicting a method 1200 for de-noising an audio visual speech in accordance with an embodiment of the present subject matter. The method 1200 may be performed by the system 102.

At block 1202, the method 1200 includes modeling a noise in the audio visual speech using a noisy speech from audio data associated with the audio visual speech to generate a reconstructed noise signal.

At block 1204, the method 1200 includes estimating the reconstructed noise signal in the audio visual speech using an audio signal and a plurality of visual frames associated with the audio visual speech.

At block 1206, the method 1200 includes partitioning the reconstructed noise signal into a plurality of windows and calculating an energy associated with each window amongst the plurality of windows.

At block 1208, the method 1200 includes estimating a noise strength in each window by performing a softmax operation over a time domain of the noise signal, wherein the noise strength is used to obtain one or more refined audio features.

At block 1210, the method 1200 includes fusing the one or more refined audio features along with one or more visual features associated with the audio visual speech using the noise strength to generate an output, wherein the output is passed through a decoder to obtain a de-noised audio visual speech.

In one example, fusing the one or more refined audio features with one or more visual features comprises: assigning a high weightage to at least one refined audio feature from the one or more audio feature corresponding to a time stamp having a high amount of noise from the audio visual speech; and assigning a low weightage to at least one other refined audio feature t corresponding to another time stamp having a low amount of noise from the audio visual speech.

In one example, the plurality of visual frames and the one or more visual features correspond to a lip region of a face of a speaker in the audio visual speech.

In one example, the one or more visual features are generated from the plurality of visual frames corresponding to a lip region of a face of a speaker in the audio visual speech by processing the plurality of visual frames through a deep learning model.

In one example, modeling the noise in the audio visual speech comprises: receiving, at an encoder and a vector quantization model, a noise signal associated with the noise in the audio visual speech as an input to generate a compressed representation; and passing, through the decoder, the compressed representation, for generating the reconstructed noise signal in a time domain signal.

In one example, the method 1200 further comprises: receiving, by a receiving engine, the audio visual speech as an input; and extracting, by the receiving engine, audio data and visual data from the audio visual speech, where the audio data comprises noisy speech.

Furthermore, all examples recited herein are principally intended expressly to be only for pedagogical purposes to aid the reader in understanding the principles of the invention and the concepts contributed by the inventor(s) to furthering the art and are to be construed as being without limitation to such specifically recited examples and conditions. Also, the various embodiments described herein are not necessarily mutually exclusive, as some embodiments can be combined with one or more other embodiments to form new embodiments. Given the disclosure above, various examples are set forth below. It should be noted that one or more features of an example, taken in isolation or combination, should be considered within the disclosure of this application.

Another general aspect is for a system for de-noising an audio visual speech, the method comprising: a modeling engine configured to model a noise in the audio visual speech using a noisy speech from audio data associated with the audio visual speech to generate a reconstructed noise signal; an estimation engine configured to estimate the reconstructed noise signal in the audio visual speech using an audio signal and a plurality of visual frames associated with the audio visual speech; a partitioning engine configured to partition the reconstructed noise signal into a plurality of windows and calculate an energy associated with each window amongst the plurality of windows; a noise strength estimation engine configured to estimate a noise strength in each window by performing a soft max operation over a time domain of the noise signal, wherein the noise strength is used to obtain one or more refined audio features; and a fusing engine configured to fuse the one or more refined audio features along with one or more visual features associated with the audio visual speech using the noise strength to generate an output, wherein the output is passed through a decoder to obtain a de-noised audio visual speech.

In yet another general aspect, a tangible machine-readable storage medium (e.g., a non-transitory storage medium) includes instructions that, when executed by a machine, cause the machine to perform operations comprising: modeling, by a modeling engine, a noise in the audio visual speech using a noisy speech from audio data associated with the audio visual speech to generate a reconstructed noise signal; estimating, by an estimation engine, the reconstructed noise signal in the audio visual speech using an audio signal and a plurality of visual frames associated with the audio visual speech; partitioning, by a partitioning engine, the reconstructed noise signal into a plurality of windows and calculate an energy associated with each window amongst the plurality of windows; estimating, by a noise strength estimation engine, a noise strength in each window by performing a soft max operation over a time domain of the noise signal, wherein the noise strength is used to obtain one or more refined audio features; and fusing, by a fusing engine, the one or more refined audio features along with one or more visual features associated with the audio visual speech using the noise strength to generate an output, wherein the output is passed through a decoder to obtain a de-noised audio visual speech.

Figure 13:
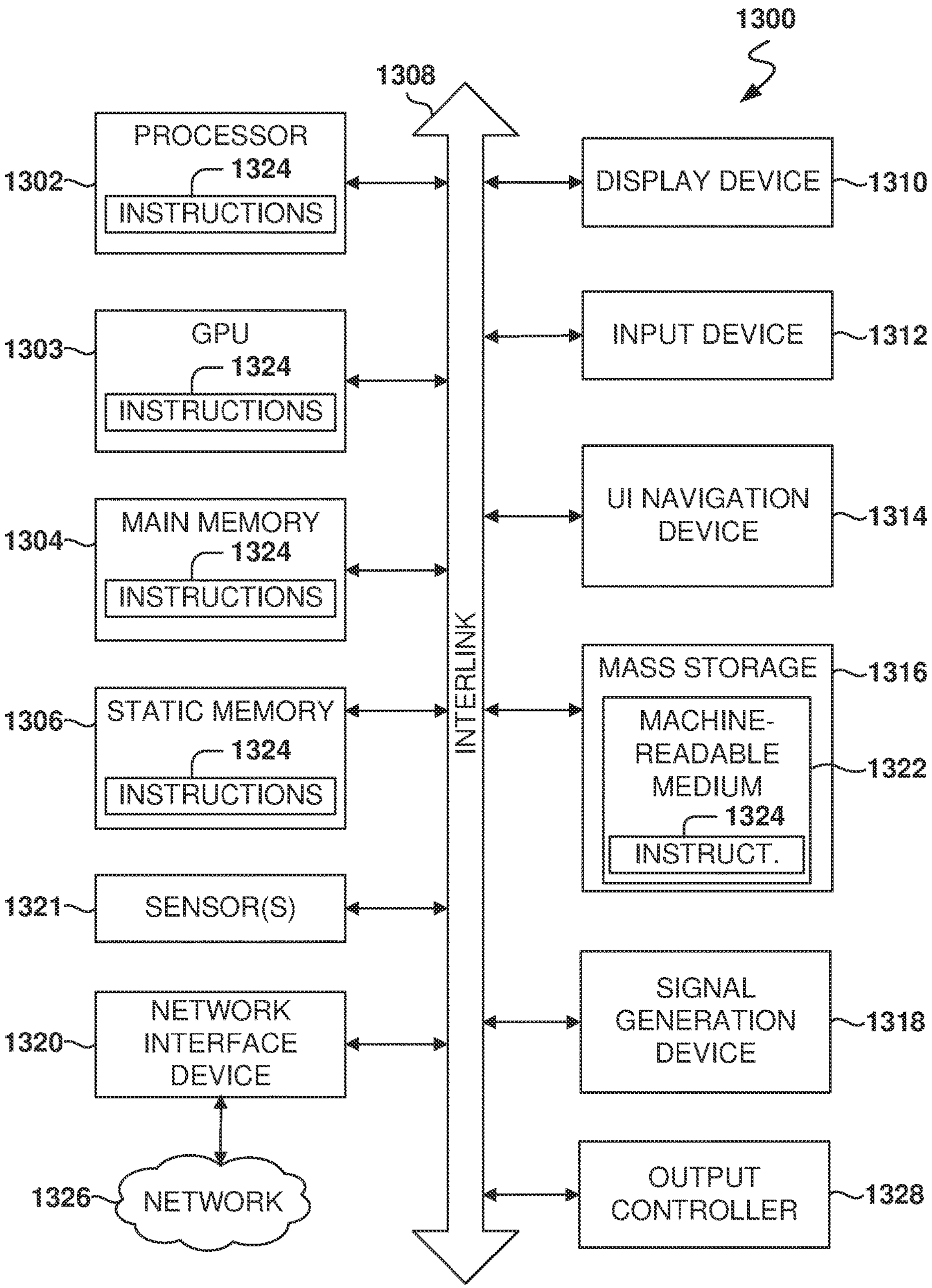
FIG. 13 is a block diagram illustrating an example of a machine upon or by which one or more example process examples described herein may be implemented or controlled.

FIG. 13 is a block diagram illustrating an example of a machine 1300 upon or by which one or more example process examples described herein may be implemented or controlled. In alternative examples, the machine 1300 may operate as a standalone device or be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1300 (e.g., computer system) may include a hardware processor 1302 (e.g., a central processing unit (CPU), a hardware processor core, or any combination thereof), a graphics processing unit (GPU 1303), a main memory 1304, and a static memory 1306, some or all of which may communicate with each other via an interlink 1308 (e.g., bus). The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device 1316 (e.g., drive unit), a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1302 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1302 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1302 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1302 may be emulated in software, running on a physical processor, as a virtual processor or virtual circuit. The virtual processor may behave like an independent processor but is implemented in software rather than hardware.

The mass storage device 1316 may include a machine-readable medium 1322 on which one or more sets of data structures or instructions 1324 (e.g., software) embodying or utilized by any of the techniques or functions described herein. The instructions 1324 may also reside, completely or at least partially, within the main memory 1304, within the static memory 1306, within the hardware processor 1302, or the GPU 1303 during execution thereof by the machine 1300. For example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium or multiple media (e.g., a centralized or distributed database and associated caches and servers) configured to store one or more instructions 1324.

The term "machine-readable medium" may include any medium that is capable of storing, encoding, or carrying instructions 1324 for execution by the machine 1300 and that causes the machine 1300 to perform any one or more of the techniques of the present disclosure or that is capable of storing, encoding, or carrying data structures used by or associated with such instructions 1324. Non-limiting machine-readable medium examples may include solid-state memories and optical and magnetic media. For example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A method for de-noising an audio visual speech, the method comprising:

modeling, by a modeling engine, a noise in the audio visual speech using a noisy speech from audio data associated with the audio visual speech to generate a reconstructed noise signal, the audio data comprising audio features;

estimating, by an estimation engine, the reconstructed noise signal in the audio visual speech using an audio signal and a plurality of visual frames associated with the audio visual speech;

partitioning, by a partitioning engine, the reconstructed noise signal into a plurality of windows in a time domain and calculating an energy associated with each window amongst the plurality of windows;

estimating, by a noise strength estimation engine, a noise strength in each window by performing a soft max operation over time domain of the reconstructed noise signal, wherein the noise strength in each window is used to obtain one or more refined audio features based on an amount of noise strength in the window; and fusing, by a fusing engine, the one or more refined audio features along with one or more visual features associated with the audio visual speech using the noise strength to generate an output, wherein the output is passed through a decoder to obtain a de-noised audio visual speech.

2. The method as claimed in claim 1, wherein fusing the one or more refined audio features further comprises:

assigning a higher weightage to refined audio features with higher amounts of noise from the audio visual speech than other refined audio features with lower amounts of noise from the audio visual speech.

3. The method as claimed in claim 1, wherein the plurality of visual frames and the one or more visual features correspond to a lip region of a face of a speaker in the audio visual speech.

4. The method as claimed in claim 1, wherein the one or more visual features are generated from the plurality of visual frames corresponding to a lip region of a face of a speaker in the audio visual speech by processing the plurality of visual frames through a deep learning model.

5. The method as claimed in claim 1, wherein modeling the noise in the audio visual speech comprises:

receiving, at an encoder and a vector quantization model, a noise signal associated with the noise in the audio visual speech as an input to generate a compressed representation; and passing, through the decoder, the compressed representation, for generating the reconstructed noise signal in a time domain signal.

6. The method as claimed in claim 1, further comprising:

receiving, by a receiving engine, the audio visual speech as an input; and extracting, by the receiving engine, audio data and visual data from the audio visual speech, wherein the audio data comprises noisy speech.

7. A system for de-noising an audio visual speech, the system comprising:

a modeling engine configured to model a noise in the audio visual speech using a noisy speech from audio data associated with the audio visual speech to generate a reconstructed noise signal, the audio data comprising audio features;

an estimation engine configured to estimate the reconstructed noise signal in the audio visual speech using an audio signal and a plurality of visual frames associated with the audio visual speech;

a partitioning engine configured to partition the reconstructed noise signal into a plurality of windows in a time domain and calculate an energy associated with each window amongst the plurality of windows;

a noise strength estimation engine configured to estimate a noise strength in each window by performing a soft max operation over time domain of the reconstructed noise signal, wherein the noise strength in each window is used to obtain one or more refined audio features based on an amount of noise strength in the window; and a fusing engine configured to fuse the one or more refined audio features along with one or more visual features associated with the audio visual speech using the noise strength to generate an output, wherein the output is passed through a decoder to obtain a de-noised audio visual speech.

8. The system as recited in claim 7, wherein fusing the one or more refined audio features further comprises:

assigning a higher weightage to refined audio features with higher amounts of noise from the audio visual speech than other refined audio features with lower amounts of noise from the audio visual speech.

9. The system as recited in claim 7, wherein the plurality of visual frames and the one or more visual features correspond to a lip region of a face of a speaker in the audio visual speech.

10. The system as recited in claim 7, wherein the one or more visual features are generated from the plurality of visual frames corresponding to a lip region of a face of a speaker in the audio visual speech by processing the plurality of visual frames through a deep learning model.

11. The system as recited in claim 7, wherein modeling the noise in the audio visual speech comprises:

receiving, at an encoder and a vector quantization model, a noise signal associated with the noise in the audio visual speech as an input to generate a compressed representation; and passing, through the decoder, the compressed representation, for generating the reconstructed noise signal in a time domain signal.

12. The system as recited in claim 7, wherein the instructions further cause the one or more computer processors to perform operations comprising:

receiving, by a receiving engine, the audio visual speech as an input; and extracting, by the receiving engine, audio data and visual data from the audio visual speech, wherein the audio data comprises noisy speech.

13. A non-transitory machine-readable storage medium including instructions that, when executed by a machine, cause the machine to perform operations comprising:

modeling, by a modeling engine, a noise in an audio visual speech using a noisy speech from audio data associated with the audio visual speech to generate a reconstructed noise signal, the audio data comprising audio features;

estimating, by an estimation engine, the reconstructed noise signal in the audio visual speech using an audio signal and a plurality of visual frames associated with the audio visual speech;

partitioning, by a partitioning engine, the reconstructed noise signal into a plurality of windows in a time domain and calculating an energy associated with each window amongst the plurality of windows;

estimating, by a noise strength estimation engine, a noise strength in each window by performing a soft max operation over time domain of the reconstructed noise signal, wherein the noise strength in each window is used to obtain one or more refined audio features based on an amount of noise strength in the window; and fusing, by a fusing engine, the one or more refined audio features along with one or more visual features associated with the audio visual speech using the noise strength to generate an output, wherein the output is passed through a decoder to obtain a de-noised audio visual speech.

14. The non-transitory machine-readable storage medium as recited in claim 13, wherein fusing the one or more refined audio features further comprises:

assigning a higher weightage to refined audio features with higher amounts of noise from the audio visual speech than other refined audio features with lower amounts of noise from the audio visual speech.

15. The non-transitory machine-readable storage medium as recited in claim 13, wherein the plurality of visual frames and the one or more visual features correspond to a lip region of a face of a speaker in the audio visual speech.

16. The non-transitory machine-readable storage medium as recited in claim 13, wherein the one or more visual features are generated from the plurality of visual frames corresponding to a lip region of a face of a speaker in the audio visual speech by processing the plurality of visual frames through a deep learning model.

17. The non-transitory machine-readable storage medium as recited in claim 13, wherein modeling the noise in the audio visual speech comprises:

receiving, at an encoder and a vector quantization model, a noise signal associated with the noise in the audio visual speech as an input to generate a compressed representation; and passing, through the decoder, the compressed representation, for generating the reconstructed noise signal in a time domain signal.

18. The non-transitory machine-readable storage medium as recited in claim 13, wherein the machine further performs operations comprising:

receiving, by a receiving engine, the audio visual speech as an input; and extracting, by the receiving engine, audio data and visual data from the audio visual speech, wherein the audio data comprises noisy speech.

* * * * *